United States Patent [19]

Shimuta et al.

[11] Patent Number: 5,543,482

[45] Date of Patent: Aug. 6, 1996

[54] COMPOSITION FOR HIGH REFRACTIVE INDEX LENS COMPRISING COPOLYMER OF VINYLBENZYLTHIO COMPOUND AND A MONOMER COPOLYMERIZABLE THEREWITH

[75] Inventors: Masanori Shimuta, Tokyo; Toru Takahashi, Handa; Hisato Abe; Kenichi Takahashi, both of Kashiwa; Akira Kurata, Mitsukaido; Osamu Aoki, Matsudo, all of Japan

[73] Assignee: Mitsubishi Gas Chemical Co., Inc., Tokyo, Japan

[21] Appl. No.: 403,101

[22] Filed: Mar. 13, 1995

Related U.S. Application Data

[63] Continuation-in-part of Ser. No. 151,040, Nov. 12, 1993, abandoned.

[30] Foreign Application Priority Data

Nov. 12, 1992 [JP] Japan .................................... 4-302514

[51] Int. Cl.$^6$ .................................................. C08F 228/04
[52] U.S. Cl. ............................................ 526/289; 528/376
[58] Field of Search ............................. 526/289; 528/376

[56] References Cited

FOREIGN PATENT DOCUMENTS 45115  2/1992  Japan .

Primary Examiner—Christopher Henderson
Attorney, Agent, or Firm—Sherman and Shalloway

[57] ABSTRACT

The present invention provides a composition comprising a vinylbenzylthio compound represented by the following general formula

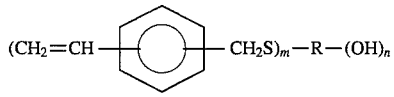

in which m is an integer of 2–3, n is an integer of 1 and R is a hydrocarbon group of 3–6 carbon atoms or a hydrocarbon group of 3–6 carbon atoms containing a bivalent sulfur atom, and a monomer radical-copolymerizable with said vinylbenzylthio compound.

Said composition is useful for producing a plastic lens having a high refractive index, a small specific gravity, excellent heat resistance and excellent processability.

24 Claims, No Drawings

COMPOSITION FOR HIGH REFRACTIVE INDEX LENS COMPRISING COPOLYMER OF VINYLBENZYLTHIO COMPOUND AND A MONOMER COPOLYMERIZABLE THEREWITH

This application is a continuation-in-part of prior application Ser. No. 08/151,040 filed Nov. 12, 1993, now abandoned.

FIELD OF THE INVENTION

The present invention relates to a composition for high refractive index lens, suitable for use as an optical material, particularly a material for optical lenses such as spectacle lens and the like comprising a copolymer of a vinylbenzylthio compound.

BACKGROUND OF THE INVENTION

A typical example of cured resins put into practical application as an optical lens is a poly[-diethylene glycol bis(ally carbonate)]. This resin, having high impact resistance, lightweightness and excellent dyeability, is in wide use as a spectacle lens for eyesight correction. The poly [diethylene glycol bis(ally carbonate)], however, has a drawback of low refractive index (1.50) and has no sufficient property. Spectacle lenses are required to have a small thickness at the periphery and lightweightness. A lens has a smaller thickness at the periphery when the lens has a higher refractive index, and a smaller lens thickness results in a lighter lens weight. A lighter lens weight is also obtained when the lens material, i.e. the material composition for lens has a smaller specific gravity. Hence, a lens having a refractive index sufficiently higher than that of the poly [diethylene glycol bis(allyl carbonate)]is desired.

A number of resins were proposed each as a resin for high refractive index lens. They are, for example, a resin obtained by a reaction between a bromine atom-containing hydroxy compound and an isocyanate compound (Japanese Laid-Open Patent Application No. 164615/1983), a resin obtained by a reaction between a sulfur atom-containing polyol compound and a polyisocyanate compound (Japanese Laid-Open Patent Application No. 217229/1985), a resin obtained by a reaction between a polythiol compound and a polyisocyanate compound (Japanese Laid-Open Patent Application No. 199016/1985), and a resin comprising a bromine atom-containing aromatic acrylic compound (Japanese Laid-Open Patent Application No. 104901/1982).

However, the resin comprising a bromine atom-containing aromatic acrylic compound has a high specific gravity and the resins obtained by a reaction between a polyol compound or a polythiol compound and a polyisocyanate compound have low heat resistance.

The present inventors previously found a resin obtained from a sulfur-containing aromatic vinyl compound and an isocyanate compound, as a resin for lens of high refractive index, small specific gravity, high strengths and high heat resistance (Japanese Laid-Open Patent Application No. 197514/1989). The present inventors made further study on a resin capable of giving a lens of higher refractive index, small specific gravity, high strengths and high heat resistance and completed the present invention.

DESCRIPTION OF THE INVENTION

According to the present invention, there is provided a composition for high refractive index lens, comprising a vinylbenzylthio compound represented by the following general formula (1)

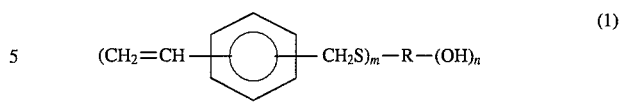

(m is an integer of 2–3, n is an integer of 1–3 and R is a hydrocarbon group of 3–6 carbon atoms or a hydrocarbon group of 3–6 carbon atoms containing a bivalent sulfur 30 om) and a monomer copolymerizable with said vinylbenzylthio compound. The vinylbenzylthio compounds of the formula (1) in which m=2 or 3 and n=1, 2 or 3 are obtained by reacting a chloromethyl styrene with a di- or tri-mercapto mono-, di- or tri-hydroxy alkyl and sodium hydroxide.

The vinylbenzylthio compound represented by the general formula (1) can be exemplified by

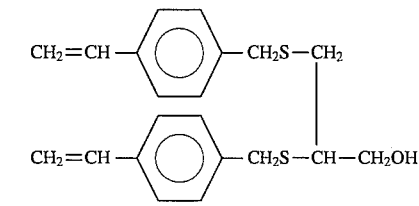

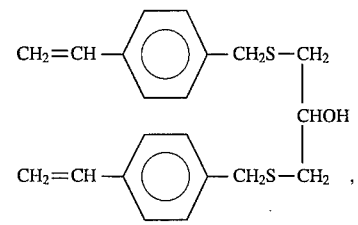

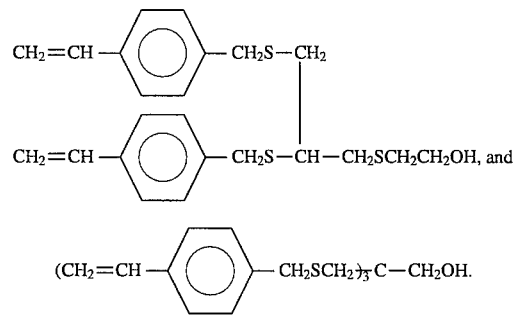

The meta-form isomers of the above compounds and mixtures thereof can also be used. The vinylbenzylthio compound of the general formula (1) is not restricted thereto. The vinylbenzylthio compound is preferably 1,3-bis(vinyl-benzylthio)-2-propanol, 2,3-bis(vinylbenzylthio)-1-propanol, 2-[2,3-bis(vinylbenzylthio)propylthio]-ethanol, 2,2,2-tris(vinylbenzylthiomethyl)-ethanol, etc.

The monomer copolymerizable with the vinylbenzylthio compound represented by the general formula (1) can be exemplified by vinyl aromatic compounds such as styrene, chlorostyrene, divinylbenzene, vinylbenzylthioethanol and the like; (meth)acrylic acid esters such as methyl methacrylate, 2-hydroxyethyl methacrylate, benzyl methacrylate, phenyl methacrylate, phenyl acrylate and the like; thio(meth)acrylic acid esters such as methyl thiomethacrylate, benzyl thiomethacrylate, phenyl thiomethacrylate, phenyl thioacrylate and the like; allyl compounds such as diallyl phthalate, diallyl isophthalate, diallyl phenyl ether and the like; and polythiols having two to four —CH$_2$SH groups bonded to a carbon atom in the molecule such as dimercaptopropanol, pentaerythritol tetrakismercaptopropionate and the like. The polythiol forms a polymer chain when its terminal SH- groups react with the terminal $CH_2=CH-$ groups of vinylbenzylthio compound of formula (1). Therefore, the product aimed at by the present invention can be obtained even by using, as comonomers, saturated polythiols, such as dimercaptopropanol or tetrakismercaptopropionate. Particularly preferable as said monomer are styrene, divinylbenzene, benzyl methacrylate, phenyl acrylate, etc.

The composition of the present invention comprises the vinylbenzylthio compound and the monomer copolymerizable therewith in amounts of 30–95% by weight, preferably 40–95% by weight and 5–70% by weight, preferably 5–60% by weight, respectively. When the amount of the vinylbenzylthio compound is smaller than the above range, the resulting composition is unable to give a resin of sufficiently high refractive index and heat resistance. When the amount is larger than the above range, the resulting composition has low handleability and gives a resin of low mechanical strengths.

In subjecting the present composition to polymerization and curing, a radical polymerization initiator is used. The radical polymerization initiator can be any substance as long as it generates a radical when heated or irradiated with ultraviolet rays or an electron beam. It includes, for example, known thermal polymerization catalysts such as benzoyl peroxide, azobisisobutyronitrile and the like and known photopolymerization catalysts such as benzophenone, benzoin and the like. The amount of the radical polymerization catalyst used varies depending upon the components used in the composition and the curing method applied for the composition and cannot be determined in a specific range, but is generally in the range of 0.01–5.0% by weight, preferably 0.1–1.0% by weight.

The composition of the present invention may further comprises known additives such as antioxidant, ultraviolet absorber and the like, whereby the resulting resin has higher utility. The composition of the present invention may furthermore comprise a known release agent, whereby the resulting resin has higher releasability.

The composition of the present invention can be made into a lens by mixing it with a radical polymerization initiator, pouring the mixture into a glass- or metal-made mold, heating the mixture and/or irradiating the mixture with ultraviolet rays or an electron beam to give rise to a polymerization and curing reaction, and taking out the resulting resin lens from the mold. The curing time is generally 0.1–100 hours, preferably 12–48 hours, and the curing temperature is generally 10°–140° C., preferably 20°–120° C. As necessary, the resulting lens may be subjected to surface treatments for imparting hard coat, reflection prevention, fog resistance, etc.

The lens obtained as above from the composition of the present invention is colorless and transparent and has a very high refractive index, a small specific gravity, light-weightness, high heat resistance, excellent processability, high strengths, etc. The lens can therefore be used in various applications as an optical material and is particularly preferable as a spectacle lens.

The present invention is hereinafter described in more detail by way of Examples. In the Examples, the cured resins obtained by polymerizing the compositions of the present invention were measured and rated for heat resistance and impact resistance as follows.

Heat resistance:

A cured resin was measured for Vicat softening point (load=5 kg). When the Vicat softening point was 120° C. or higher, the heat resistance of the cured resin was rated as good.

Impact resistance:

A 20-g iron ball was dropped onto a cured resin 60 mm (dia.)×2.5 mm (thickness) from a height of 1.27 m. When no break-age occurred, the impact resistance of the cured resin was rated as good.

EXAMPLE 1

There were uniformly mixed 90 parts by weight of 2,3-bis(vinylbenzylthio)-1-propanol obtained by a reaction between 2,3-dimercapto-1-propanol, chloromethylstyrene (m-form/p-form=7/3) and sodium hydroxide, 10 parts by weight of styrene, 0.2 Dart by weight of tertbutyl peroxyneodecanoate [Perbutyl ND (trade name) manufactured by NIPPON OIL & FATS CO., LTD.]and 0.2 part by weight of 1,1-azobis-(cyclohexane-carbonitrile) [V-40 (trade name) manufactured by Wako Pure Chemical Industries, Ltd,]. The mixture was poured into a mold consisting of a glass mold and a gasket, then subjected to linear temperature elevation from 35° C. to 110° C. in 15 hours, and kept at 110° C. for 1 hour to give rise to polymerization and curing.

The cured material obtained was colorless and transparent and had an Abbe number of 31, a very high refractive index ($N_D$ of 1.65 and a very small specific gravity of 1.19. The cured material also had good heat resistance and impact resistance, and was excellent as a lens, particularly a spectacle lens.

EXAMPLE 2

A composition was prepared and subjected to polymerization and curing in the same manner as in Example 1 with the exception that there were used 80 parts by weight of 2,3-bis(vinylbenzylthio)-1-propanol obtained by the same reaction as in Example 1 and 20 parts by weight of styrene.

The cured material obtained was colorless and transparent and had an Abbe number of 31, a very high refractive index ($N_D^{20}$) of 1.64 and a very small specific gravity of 1.18. The cured material also had good heat resistance and impact resistance, and was excellent as a lens, particularly a spectacle lens.

EXAMPLE 3

A composition was prepared and subjected to polymerization and curing in the same manner as in Example 1 with the exception that there were used 90 parts by weight of 2,3-bis(p-vinylbenzylthio)-1-propanol obtained by a reaction between 2,3-dimercapto-1-propanol, p-chloromethylstyrene and sodium hydroxide and 20' parts by weight of styrene.

The cured material obtained was colorless and transparent and had an Abbe number of 31, a very high refractive index ($N_D^{20}$) of 1.65 and a very small specific gravity of 1.19. The cured material also had good heat resistance and impact resistance, and was excellent as a lens, particularly a spectacle lens.

EXAMPLE 4

A composition was prepared and subjected to polymerization and curing in the same manner as in Example 1 with the exception that there were used 90 parts by weight of 2-[2,3-bis(vinylbenzylthio)propylthio]-ethanol obtained by a reaction between 2-(2,3-dimercaptopropylthio)-ethanol, chloromethylstyrene (m-form/p-form=7/3) and sodium hydroxide and 10 parts by weight of styrene.

The cured material obtained was colorless and transparent and had an Abbe number of 31, a very high refractive index ($N_D^{20}$) of 1.65 and a very small specific gravity of 1.20. The cured material also had good heat resistance and impact resistance, and was excellent as a lens, particularly a spectacle lens.

EXAMPLE 5

A composition was prepared and subjected to polymerization and curing in the same manner as in Example 1 with the exception that there were used 90 parts by weight of 1,3-bis(vinylbenzylthio)-2-propanol obtained by a reaction between 1,3-dimercapto-2-propanol, chloromethyl-styrene (m-form/p-form=7/3) and sodium hydroxide and 10 parts by weight of styrene.

The cured material obtained was colorless and transparent and had an Abbe number of 31, a very high refractive index ($N_D^{20}$) of 1.65 and a very small specific gravity of 1.18. The cured material also had good heat resistance and impact resistance, and was excellent as a lens, particularly a spectacle lens.

EXAMPLE 6

A composition was prepared and subjected to polymerization and curing in the same manner as in Example 1 with the exception that there were used 90 parts by weight of 2,3-bis(vinylbenzylthio)-1-propanol obtained by the same reaction as in Example 1 and 10 parts by weight of divinylbenzene.

The cured material obtained was colorless and transparent and had an Abbe number of 30, a very high refractive index ($N_D^{20}$) of 1.65 and a very small specific gravity of 1.20. The cured material also had good heat resistance and impact resistance, and was excellent as a lens, particularly a spectacle lens.

EXAMPLE 7

A composition was prepared and subjected to polymerization and curing in the same manner as in Example 1 with the exception that there were used 90 parts by weight of 2,3-bis(vinylbenzylthio)-1-propanol obtained by the same reaction as in Example 1 and 10 parts by weight of benzyl methacrylate.

The cured material obtained was colorless and transparent and had an Abbe number of 32, a very high refractive index ($N_D^{20}$) of 1.64 and a very small specific gravity of 1.22. The cured material also had good heat resistance and impact resistance, and was excellent as a lens, particularly a spectacle lens.

EXAMPLE 8

A composition was prepared and subjected to polymerization and curing in the same manner as in Example 1 with the exception that there were used 10 parts by weight of pentaerythritol tetrakis(1-mercaptopropionate), C—(CH$_2$O—CO—CH$_2$—CH$_2$SH)$_4$, instead of 10 parts by weight of styrene, 0.6 Dart by weight of tert-butyl peroxyneodecanoate instead of 0.2 part by weight of tert-butyl peroxyneodecanoate and 0.4 part by weight of 1,1-azobis-(cyclohexane-carbonitrile) instead of 0.2 part by weight of 1,1-azobis-(cyclohexane-carbonitrile).

The cured material obtained was colorless and transparent and had an Abbe number of 32, a very high refractive index ($N_D^{20}$) of 1.64 and very small specific gravity of 1.21. The cured material also had good heat resistance and impact resistance, and was excellent as a lens, particularly a spectacle lens.

EXAMPLE 9

A composition was prepared and subjected to polymerization and curing in the same manner as in Example 1 with the exception that there were used 10 parts by weight of 1,3-dimercapto-2-propanol, HSCH$_2$—CHOH—CH$_2$SH, instead of 10 parts by weight of styrene, 0.6 part by weight of tert-butyl peroxyneodecanoate instead of 0.2 part by weight of tert-butyl peroxyneodecanoate and 0.4 part by weight of 1,1-azobis-(cyclohexane-carbonitrile) instead of 0.2 part by weight of 1,1-azobis-(cyclohexanecarbonitrile).

The cured material obtained was colorless and transparent and had an Abbe number of 32, a very high refractive index ($N_D^{20}$) of 1.66 and very small specific gravity of 1.19. The cured material also had good heat resistance and impact resistance, and was excellent as a lens, particularly a spectacle lens.

We claim:

1. A composition for high refractive index lens, comprising a vinylbenzylthio compound represented by the following general formula (1)

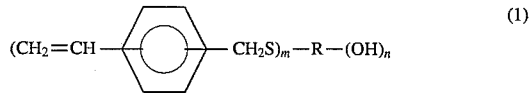

in which m is an integer of 2–3, n is an integer of 1 and R is a hydrocarbon group of 3–6 carbon atoms or a hydrocarbon group of 3–6 carbon atoms containing a bivalent sulfur atom, a monomer copolymerizable with said vinylbenzylthio compound selected from the group consisting of vinyl aromatic compounds, (meth)acrylic acid esters, thio(meth)acrylic acid esters and allyl compounds, and radical polymerization initiator.

2. The composition for high refractive index lens set forth in claim 1, wherein the vinylbenzylthio compound is a compound of the general formula (1) in which m is 2 or 3, and R is

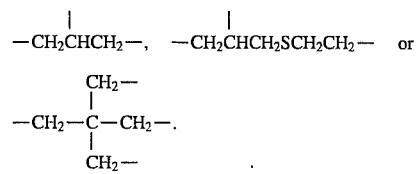

3. The composition for high refractive index lens set forth in claim 1, wherein the copolymerizable monomer is an allyl compound selected from the group consisting of diallyl phthalate, diallyl isophthalate and diallyl phenyl ether.

4. The composition for high refractive index lens set forth in claim 1, wherein the copolymerizable monomer is a dimercaptopropanol or a pentaerythritol tetrakismercaptopropionate.

5. The composition for high refractive index lens set forth in claim 1, wherein the copolymerizable monomer is a thiomethacrylic acid ester or a thioacrylic acid ester.

6. The composition for high refractive index lens set forth in claim 1, wherein the copolymerizable monomer is a vinyl aromatic compound.

7. The composition for high refractive index lens set forth in claim 1 wherein the vinylbenzylthio compound is at least one compound selected from 1,3-bis-(vinylbenzylthio)-2-propanol, 2,3-bis(vinylbenzylthio)-1-propanol, 2-(2,3-bis-(vinylbenzylthio)propylthiol)-ethanol and 2,2,2-tris(vinylbenzylthiomethyl)-ethanol.

8. The composition for high refractive index lens set forth in claim 1, wherein the weight ratio of the vinylbenzylthio compound to the copolymerizable monomer is 30:70 to 95:5.

9. The composition for high refractive index lens set forth in claim 1, wherein the weight ratio of the vinylbenylthio compound to the copolymerizable monomer is 40:60 to 95:5.

10. The composition for high refractive index set forth in claim 1, wherein the radical polymerization initiator is in an amount of 0.01–5.0% by weight based on the total weight of the composition.

11. The composition for high refractive index set forth in claim 1, which comprises a radical polymerization initiator in an amount of 0.1–1.0% by weight based on the total composition weight.

12. A composition for high refractive index lens comprising a vinylbenzylthio compound represented by the following general formula (1)

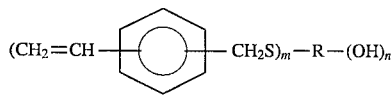

in which m in an integer of 2–3, n is an integer of 1 and R is an alkyl hydrocarbon group of 3–6 carbon atoms or an alkyl hydrocarbon group of 3–6 carbon atoms containing a bivalent sulfur atom, a monomer copolymerizable with said vinylbenzylthio compound selected from the group consisting of vinyl aromatic compounds and (meth)acrylic acid esters and a radical polymerization initiator.

13. A composition for high refractive index lens set forth in claim 12, wherein the vinylbenzylthio compound is a compound of the general formula (1) in which m is 2 or 3, and R is

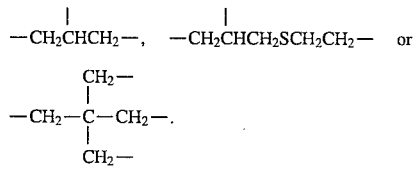

14. The composition for high refractive index lens set forth in claim 12, wherein the copolymerizable monomer is a vinyl aromatic compound.

15. The composition for high refractive index lens set forth in claim 12, wherein the copolymerizable monomer is a methacrylic acid ester or an acrylic acid ester.

16. The composition for high refractive index lens set forth in claim 1, wherein the copolymerizable monomer is a member selected from the group consisting of styrene, divinylbenzene and benzyl methacrylate.

17. The composition for high refractive index lens set forth in claim 12, wherein the vinylbenzylthio compound is at least one compound selected from 1,3-bis-(vinylbenzylthio)-2-propanol, 2,3-bis(vinylbenzylthio)-1-propanol, 2-(2,3-bis(vinylbenzylthio)propylthio)-ethanol and 2,2,2-tris(vinylbenzylthiomethyl)-ethanol.

18. The composition for high refractive index lens set forth in claim 12, wherein the weight ratio of vinylbenzylthio compound to monomer copolymerizable therewith is 40:60 to 95:5.

19. The composition for high refractive index set lens forth in claim 12, wherein the radical polymerization initiator is in an amount of 0.1–1.0% by weight based on the total weight of the composition.

20. The composition for high refractive index lens set forth in claim 12, wherein the copolymerizable monomer is a member selected from the group consisting of styrene, divinylbenzene and benzyl methacrylate.

21. A composition for high refractive index lens, comprising a vinylbenzylthio compound represented by the following general formula (1)

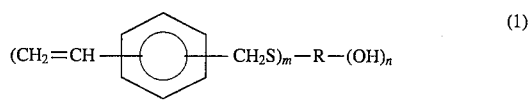

in which m is an integer of 2–3, n is an integer of 1 and R is a hydrocarbon group of 3–6 carbon atoms or a hydrocarbon group of 3–6 carbon atoms containing a bivalent sulfur atom, and a monomer copolymerizable with said vinylbenzylthio compound selected from the group consisting of styrene, divinylbenzene, benzyl methacrylate, pentaerythritol tetrakismercaptopropionate and dimercaptopropanol.

22. The composition for high refractive index lens set forth in claim 21, wherein the vinylbenzylthio compound is a compound of the general formula (1) in which m is 2 or 3, and R is

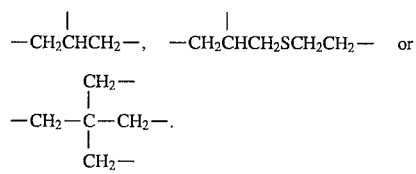

23. The composition of high refractive index lens set forth in claim 21, wherein the vinylbenzylthio compound is at least one compound selected from 1,3-bis-(vinylbenzylthio)-2-propanol, 2,3-bis(vinylbenzylthio)-1-propanol, 2-(2,3-bis(vinylbenzylthio)propylthio)-ethanol and 2,2,2-tris(vinylbenzylthiomethyl)-ethanol.

24. The composition for high refractive index lens set forth in claim 21, which comprises a radical polymerization initiator in an amount of 0.1–1.0% by weight based on the total weight of the composition.

* * * * *